July 13, 1937.    O. DIETRICH    2,087,184
BALL AND ROLLER BEARING
Filed Aug. 20, 1935

Inventor: Otto Dietrich

Patented July 13, 1937

2,087,184

UNITED STATES PATENT OFFICE 2,087,184

BALL AND ROLLER BEARING

Otto Dietrich, Friedrichshafen, Germany, assignor to Maybach-Motorenbau G. m. b. H., Friedrichshafen, Bodensee, Germany Application August 20, 1935, Serial No. 36,979
In Germany September 21, 1934

5 Claims. (Cl. 308—196)

My invention relates to roller or ball bearings, especially those used in connection with crank shafts or engines. In fast running internal combustion light weight engines for vehicles it is advisable to provide roller bearings on the crank shaft but their application is difficult especially because of the dimensions which are necessary to get them over the cranks. That is why several designers have come to the suggestion to have only an outer race way and to construct this race way in two halves which are connected together in a suitable manner after being mounted on the shaft. The inner race way in such cases was left away so that the balls or rollers had to bear directly on the outer circumference of the crank shaft portion to which the bearing was applied.

The great draw back in such a construction is that the entire crank shaft has to be removed and a new one mounted whenever slight damages occur to one of the several bearing surfaces, which is, of course, very troublesome and expensive.

I improve these conditions according to my invention by providing an inner race way made of several individual portions and connected together in a manner which affords a minimum of space sideways so that it is not necessary to make the crank shaft longer than otherwise. This will be understood best when having reference to the drawing which represents an example embodying my invention.

The crank shaft C is surrounded by an inner race way made up of two portions $1a$ and $1b$. The outer race way is indicated at 2 and the rollers at 3. The two portions $1a$ and $1b$ of the inner race way meet at 4 and they are held together by connecting members 7. These members 7 are shifted into their portions in the direction of arrows A, respectively. I prefer to provide inclined surfaces 6 in such members 7 which bear against adequate surfaces provided in corresponding slots of the two inner race way portions $1a$ and $1b$.

Figure 1:
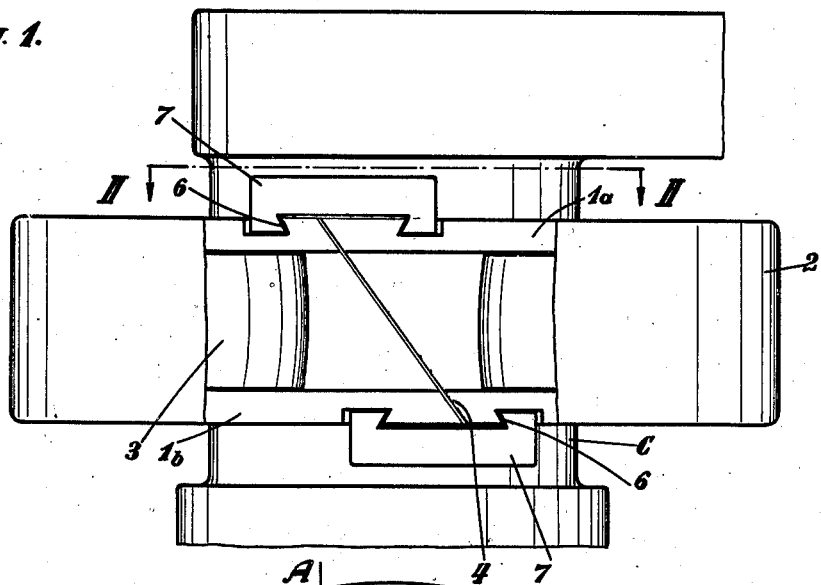
Fig. 1 is a plan view on the crank shaft and the bearing, but partly in section and a roller element being removed.
Figure 2:
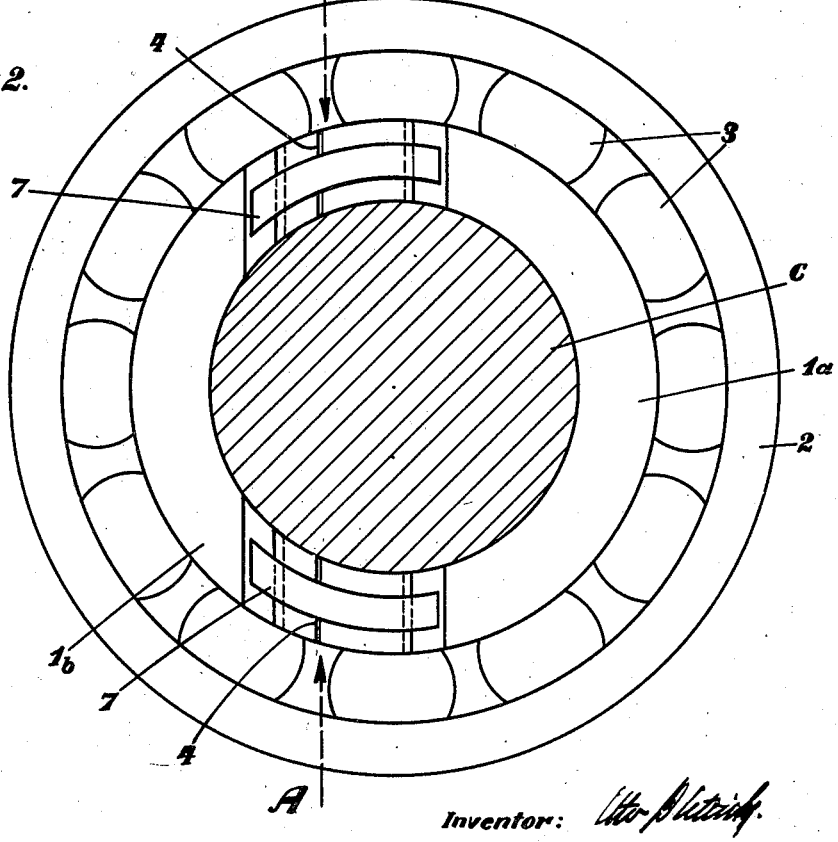
Fig. 2 is a section through the crank shaft, taken on line II—II of Fig. 1, and showing the roller bearing in side elevation.

To make certain that the inner race way portions closely fit around the shaft C it is advisable to make them a trifle smaller from the beginning (for instance 1/100 of a millimeter) so that a very small distance exists between them, as shown enlarged at 4 in Fig. 1. Also connecting members 7 may be made hot before shifted into their positions so that on cooling down they tend to draw the two portions $1a$ and $1b$ together. Furthermore, giving the meeting line 4 the inclination as shown in Fig. 1 brings the advantage that the rollers 3 when rotating do not suddenly have to change from portion $1a$ to portion $1b$ or vice versa.

It is well known to divide the outer race way of ball or roller bearings, but in the example represented it is assumed that it be made integral. The usual cage for the rollers is not shown in the drawing as it is known to every expert and would only complicate the drawing unnecessarily.

I do not want to be limited to the details described or shown in the drawing, as many variations will occur to those skilled in the art.

What I claim is:

1. A roller element including an outer race way and an inner race way having rolling elements interposed therebetween, said inner race way comprising a plurality of removable segments having complementary locking surfaces adjacent the ends, a locking member for securing the ends of the segments together slidable in a direction perpendicular to the axis of the bearing into locking engagement with the complementary locking surfaces of the segments.

2. A roller bearing including an outer race way and an inner race way having rolling elements interposed therebetween, said inner race way comprising a plurality of segments having slots formed in their outer side walls adjacent the ends thereof and extending inwardly from the periphery of the segments and members adapted to fit in the slots for connecting the segments together.

3. A roller bearing for a crank shaft including an outer race way and an inner race way having rolling elements interposed therebetween, the inner race way being adapted to fit about the crank shaft and comprising a plurality of segments having slots in the outer side walls adjacent the ends extending in a plane substantially at right angles to the axis of the inner race way and connecting members adapted to fit in the slots and hold the race way tightly about the crank shaft.

4. A roller bearing for a crank shaft including an outer race way and an inner race way rolling elements interposed therebetween, said inner race way being adapted to fit about the crank shaft and comprising a plurality of segments, the segments having slots in the side walls near the ends extending in a plane substantially at right angles to the axis of the inner race way and members adapted to fit in the slots of adjacent segments and connect the segments together, the inner race way segments when surrounding the crank shaft being separated from each other a small distance so that the connecting members will maintain the race way tightly about the crank shaft.

5. A roller bearing for a crank shaft including an outer race way and an inner race way having rollings elements interposed therebetween, the inner race way being adapted to fit about the crank shaft and comprising a plurality of segments having slots in the outer side walls adjacent the ends the end edges of each segment meeting in lines which are inclined to the axis of the race way and connecting members adapted to fit in the slots of adjacent segments to hold the segments tightly about the crank shaft.

OTTO DIETRICH.